United States Patent Office 2,923,685

Patented Feb. 2, 1960

2,923,685

ALKALI METAL MODIFIED FERROMAGNETIC CHROMIUM OXIDE, ITS PREPARATION AND USE AS THE MAGNETIC MATERIAL OF RECORDING MEMBERS

Thomas J. Swoboda, Wilmington, Del., assignor to E. I. du Pont de Nemours and Company, Wilmington, Del., a corporation of Delaware No Drawing. Application August 21, 1958
Serial No. 756,296

22 Claims. (Cl. 252—62.5)

This invention relates to ferromagnetic materials and their preparation. More particularly, it relates to a new type of ferromagnetic chromium oxide, to a method for its preparation and to magnetic recording members having this new type of ferromagnetic chromium oxide as the magnetic track.

Ferromagnetic materials are employed in a variety of applications. For example, these materials are employed in magnetic sound recording tapes, drums and records, memory devices, microwave circuitry, and as magnetic cores such as coil cores in electronic equipment. In some of these applications, especially those requiring magnetic materials of low loss characteristics at high frequencies, or of relatively high coercive force, ferromagnetic oxides are normally more useful than ferromagnetic metals. Heretofore only cobalt, nickel, or iron alloys or magnetic iron oxides have been used in the manufacture of magnetic recording tapes.

Among the known ferromagnetic oxides is chromium dioxide. However, the heretofore known forms of this oxide have not possessed the magnetic properties and particle characteristics which would make them useful in certain practical applications, e.g., in the manufacture of magnetic recording tapes, magnetic memory cores for computers, gyrator elements, etc.

Recently a new form of chromium oxide having a combination of properties which makes it particularly useful in various applications has been prepared. This new chromium oxide of small particle size, the average particle length being less than 10 microns, and the crystals having an elongated shape with their length from 2 to 6 times their width and having a tetragonal crystal structure recently has been discovered. This new form of ferromagnetic chromium oxide is more fully described and claimed in U.S. patent application of Paul Arthur, Jr., Serial No. 515,521, filed June 14, 1955. Even though these new chromium oxides are especially useful in certain applications, it is still desirable to develop other types of chromium oxides having more improved magnetic and physical properties. One such type is described in my copending application Serial No. 515,523, filed June 14, 1955, now abandoned, of which the present application is a continuation-in-part.

It is an object of this invention to provide a new type of ferromagnetic chromium oxide and a method for its preparation. A further object is to provide novel chemically modified ferromagnetic chromium oxides which are especially useful in the manufacture of magnetic recording tapes and in the manufacture of ceramic bodies such as magnetic cores. Another object is to provide a magnetic recording member having a magnetic track comprising this new type of chemically modified ferromagnetic chromium oxide. Other objects will appear hereinafter.

These and other objects of this invention are accomplished by providing novel ferromagnetic chromium oxides consisting essentially of small acicular particles of tetragonal crystal structure whose average length is not more than 10 microns with no more than 10% of the particles being longer than 10 microns, the said oxides containing 59.5% to 61.9% chromium and 0.03% to 1% (300–10,000 p.p.m.) of an alkali metal as an integral constituent of the crystal lattice. These novel ferromagnetic chromium oxides in which some of the chromium atoms in the crystal lattice are replaced by alkali metal atoms exhibit on X-ray diffraction analysis a pattern corresponding to that of a tetragonal crystal structure having cell constants of $a_0=4.41\pm0.10A$, and $c_0=2.90\pm0.10A$.

The novel chemically modified ferromagnetic chromium oxides of this invention have useful magnetic and physical properties. These new chemically modified ferromagnetic chromium oxides are particularly useful as the magnetic material in magnetic recording members which comprise a carrier, such as a tape, drum or record of non-magnetic material having bonded thereto a magnetic track of magnetic material and a binder therefor.

The process of making the products of this invention comprises heating chromium trioxide, $CrO_3$, at a temperature within the range of 400° to 525° C. under a pressure of at least 500 atmospheres and in the presence of an aqueous alkali metal sulfate solution, and separating and drying the resulting chemically modified chromium oxide.

As indicated above, the ferromagnetic chromium oxides of this invention containing from 0.03% to 1% of their weight of alkali metal atoms as integral parts of the crystal lattice possess a number of properties or characteristics which make them especially suitable for use in certain applications. In addition to their being of small particle size as defined above, these particular particles also possess a more acicular, or needlelike, shape than hitherto known chromium oxides. They have an average axial ratio, i.e., the ratio of the length of the particle to its width or thickness, of at least 2:1. Generally this ratio is at least 8:1 and sometimes it is in the range 10–20:1. This acicular shape makes them especially well adapted for use in coating compositions to be applied on film, tape or other substrate. As a result of this acicular shape, the particles can be oriented in closer relationship during the mechanical spreading of the oxide composition in thin layers on a substrate. This in turn results in more uniform magnetic characteristics of the coated substrate.

The tetragonal crystal structure of the chromium oxides of this invention containing as constituents of the crystal lattice a small proportion of alkali metals as modifiers is of the rutile type, i.e., it has the same type of crystal structure as rutile, $TiO_2$. Ferromagnetic chromium oxides preparedb y hitherto known published methods have also exhibited in conjunction with other crystal structures the tetragonal crystal structure. However, they have always been associated with the chromium oxides having other crystal structures, e.g., the corundum-type crystal structure of $Cr_2O_3$. In contrast, the chemically modified chromium oxides of this invention have only a single crystal structure as shown by their X-ray diffraction pattern. In an ideal tetragonal crystal of chromium dioxide there would be one chromium atom for each two oxygen atoms, hence the chromium content of such a crystal would be 61.91%. However, the chromium oxides of this invention contain 59.5 to 61.9% chromium and this indicates that there is a chromium deficiency in the crystal lattice, i.e., there are a small number of the chromium atoms required for the ideal tetragonal crystal missing in the products of this invention. In addition to this deficiency of chromium, alkali metals are contained as an integral constituent of the crystal lattice in the products of this invention.

The use of an alkali metal sulfate in the preparation of the modified chromium oxides of this invention has the following advantages: It favors the formation of acicular particles and the formation of products exhibiting high coercive forces.

The process of this invention is conveniently carried out as follows: A corrosion-resistant container, i.e., a container constructed of a material which is inert to the reactants under the reaction conditions, is used. A very satisfactory container is made of platinum. The container can be a completely sealed tube having flexible walls or it can be any type of vessel permitting transmission of the desired pressure to the reaction system such as a cylindrical tube closed at one end and equipped at the other end with a closely fitting piston. The container is charged with chromium trioxide and an aqueous solution of an alkali metal sulfate, e.g., lithium, sodium, potassium or cesium sulfate. This aqueous solution acts as a crystallization medium and an amount sufficient to control crystallization of the chromium oxide in it is used. Amounts of aqueous alkali metal sulfate solution ranging from 0.1 to 1.25 times the weight of the chromium trioxide charged are operable. The use of proportions of alkali metal sulfate solution ranging from 0.1 to 0.5 times the weight of chromium trioxide results in better yields of the chemically modified chromium oxides of this invention.

The concentration of the alkali metal sulfate in the aqueous solution can be varied widely in the process of this invention. Ferromagnetic chromium oxides having the above-specified proportions of alkali metal in the crystal lattice are obtained with alkali metal sulfate solutions ranging from 4% to 50% (by weight) concentration. However, it is preferred to use alkali metal sulfate solutions of 20% to 30% concentration since these give higher yields of the desired chromium oxides. When concentrations of 4–20% are employed, it is preferred that the amount of solution be at least 0.2 times the weight of chromium trioxide. Generally concentrations in this range favor the formation of particles having small axial ratios while higher concentrations favor more acicular particles. Optionally the alkali metal sulfate solution can be acidified with a small amount of sulfuric acid, e.g., about 5% based on the total weight of the solution. The presence of sulfuric acid is not essential since chromium oxides of the type defined herein are obtained without it.

After the corrosion-resistant container is charged with the chromium trioxide and aqueous alkali metal sulfate solution, it is closed and placed inside a larger water-filled vessel capable of withstanding high temperatures and pressures. The outer vessel is then closed and the water pressure is raised to at least 500 atmospheres. Satisfactory results are obtained with pressures ranging from 500 to 3000 atmospheres. Pressures above 3000 atmospheres can be used if the available equipment is strong enough to withstand them. The reaction vessel is then heated to a temperature between 400° and 525° C., preferably between 450° and 475° C. Temperatures above 525° C. are not desirable since they cause decomposition of the ferromagnetic chromium oxide.

The reaction times are not critical. Periods ranging from a few minutes, e.g., 5 minutes, to an hour or more at the reaction temperature of 400° to 525° C. are sufficient. Longer times are not necessary to form the chemically modified chromium oxides of this invention. Likewise, the time of heating the reaction vessel to the reaction temperature and the time of cooling it back after reaction is completed can vary considerably, depending on the size of the vessel and the charge, and on the capacity of the heating and cooling equipment. However, it is preferred that heating to a reaction temperature be completed in less than one hour, and that cooling be completed in 24 hours.

After the reaction mixture has been heated to the desired operating temperature for the desired time, the entire reaction vessel is cooled with the pressure maintained until room temperature (ca. 25° C.) is reached. The water pressure is then released, and this results in the corrosion-resistant reaction vessel being ruptured by the by-product oxygen present in the container. The resulting, finely divided, black, acicular, chemically modified chromium oxide is separated from a dark-colored aqueous phase by filtration, and is then washed with water and dried. It is often convenient to follow the water washing of the chromium oxide particles by a wash with a water-miscible volatile organic solvent, e.g., acetone, before air-drying the product.

The chromium trioxide and alkali metal sulfate used in the process of this invention can be any of the commercially available materials of good quality. They do not need to be specially purified.

The chemically modified chromium oxides of this invention exhibit several magnetic characteristics which make them especially valuable for use in various applications. Among the magnetic properties of a material which are critical factors in their usefulness in certain applications are the intrinsic coercive force, $H_{ci}$, and the maximum induction, $B_m$. Definitions of these magnetic terms and the symbols representing them are defined in Special Technical Publication No. 85 of the American Society for Testing Materials, entitled "Symposium on Magnetic Testing" (1948), pages 191–198.

The alkali metal-modified chromium oxides of this invention have a maximum magnetic induction, $B_m$, of the same magnitude as the best ferromagnetic iron oxides now used in magnetic recording tapes. Although values of $B_m$ are readily obtained, e.g., by means of a cathode ray magnetization curve tracer as described in detail by Scherb in the Review of Scientific Instruments, 19, 411–419 (1948), the saturation per gram or sigma value, $\sigma_s$, is more convenient for routine determinations (Bozorth, Ferromagnetism, D. Van Nostrand & Co., New York, 1951, pages 7 and 8). The maximum induction and sigma value are related by the equation $B_m - H = 4\pi d\sigma_s$, where H is field strength and $d$ is density of sample. The sigma values given herein are determined on apparatus similar to that described by T. R. Bardell on pages 226–228 of "Magnetic Materials in the Electric Industry," Philosophical Library, New York, 1955.

Another magnetic property which is greatly desired for materials used in certain applications is the intrinsic coercive force, $H_{ci}$. The alkali metal-modified chromium oxides of this invention exhibit coercive forces significantly greater than the coercive forces of the chromium oxides prepared in the presence of water only as described in the aforementioned application Serial No. 515,521. The intrinsic coercive forces of the products of this invention range from at least 60 to about 125 oersteds. Ferromagnetic oxides having such intrinsic coercive forces are especially suitable for use in magnetic recording tapes, and in focusing magnets. The values for the intrinsic coercive forces given herein are determined by a modified form of the apparatus described by Davis and Hartenheim in the Review of Scientific Instruments, 7, 147 (1936).

The invention is illustrated in further detail by the following examples in which the proportions of ingredients are expressed in parts by weight unless otherwise noted.

*Example I*

A platinum tube having flexible walls is charged with 5.00 parts of chromium trioxide, 1.25 parts of water and 0.31 part of sodium sulfate. The charged tube is sealed and placed in a water-filled metal bomb where it is heated to 450° C. and 1000 atmospheres pressure. After holding at this temperature and pressure for 1 hour, the reactor is cooled and depressured. The platinum tube is opened carefully to release the oxygen formed as a by-product of the reaction. A black, finely divided, strongly magnetic powder is separated from a very dark amber-colored liquid by filtration. The solid is washed with water and then with acetone and is finally air-dried.

There is isolated 3.62 parts of chromium oxide needles, and about 0.2 part of chromium oxide needles remains adhering to the walls of the tube. The total yield amounts to about 90% of theory. This acicular chromium oxide has an intrinsic coercive force of 88 oersteds.

This ferromagnetic sodium-modified chromium oxide has a rutile-type crystal structure with cell constants of $a_0=4.41A.$ and $c_0=2.92A.$ The particles exhibit an X-ray diffraction pattern having the reflection lines listed in the following table. In this table the column headed "*d*" gives the interplanar spacings in Angstrom units, and the column headed "I" gives the relative reflection intensities.

| d | I | d | I | d | I |
|---|---|---|---|---|---|
| 3.13 | strong. | 1.321 | medium. | 0.881 | faint. |
| 2.435 | strong. | 1.317 | medium. | 0.873 | weak. |
| 2.220 | faint. | 1.21 | faint. | 0.867 | faint. |
| 2.135 | medium. | 1.13 | faint. | 0.847 | weak. |
| 1.979 | weak. | 1.10 | faint. | 0.820 | weak. |
| 1.638 | strong. | 1.06 | weak. | 0.811 | weak. |
| 1.565 | medium. | 1.01 | weak. | 0.790 | weak. |
| 1.458 | weak. | 0.986 | faint. | | |
| 1.397 | faint. | 0.949 | faint. | | |

*Example II*

Another sample of sodium-modified chromium oxide is prepared by the procedure described in Example I, employing a charge consisting of 5.00 parts of chromium trioxide, 1.25 parts of 5% aqueous sulfuric acid, and 0.31 part of sodium sulfate. Heating is carried out at 450° C. under 1000 atmospheres pressure for 1 hour. The resulting acicular ferromagnetic chromium oxide is found to contain 59.65% chromium, and 800–4000 p.p.m. of sodium. The product has an intrinsic coercive force, $H_{ci}$, of 77 oersteds.

Examination of the chromium oxide crystals by electron microscope at a magnification of 2400X indicates that individual needles have lengths ranging from 0.2–8 microns. The particles are acicular and have length-to-width ratios ranging from about 4:1 to about 20:1, the average being about 10:1. The individual needles form aggregates 2 to 4 microns across.

A dispersion of these chromium oxide particles with a nitrocellulose binder is spread in a uniform layer on a cellulose acetate tape. The resulting tape after coating and drying has a total thickness of about 2 mils, and the thickness of the magnetic coating is about 0.5 mil. The coercive force of the magnetic coating on the tape is found to be 60 oersteds. This tape is suitable for use as a magnetic recording tape.

*Example III*

A platinum tube with flexible walls is charged with 5.00 parts of chromium trioxide, 1.25 parts of 5% aqueous sulfuric acid and 0.31 part of sodium sulfate. The tube is sealed and then heated at 450° C. at a pressure of 750 atmospheres for one hour.

On working up the reaction product as in Example I, there is isolated 3.72 parts of acicular chromium oxide with about 0.2 part of product still adhering to the walls of the tube. The total yield corresponds to about 93% of the theoretical. The needlelike crystals are aggregated into clumps of about 2 to 4 microns in diameter, with the length of the individual needles ranging from 0.2 to 8 microns and being 3 to 12 times the width. The average length-to-width ratio is about 8:1. This product contains 60.07% chromium and 0.1–1.0% (1000–10,000 p.p.m.) of sodium. It has an intrinsic coercive force of 84 oersteds.

*Example IV*

A flexible platinum tube is charged with 5.00 parts of chromium trioxide, 0.32 part of potassium sulfate, and 1.30 parts of water. The tube is sealed and heated to 450° C. under 1000 atmospheres pressure for 0.5 hour as in the preceding examples. After the tube is cooled, depressured, and opened, there is isolated by filtration, washing, and drying 3.57 parts of black, finely divided, acicular chromium oxide. On analysis this chromium oxide is found to contain 1000–5000 p.p.m. (0.1–0.5%) potassium. This chromium oxide has an intrinsic coercive force, $H_{ci}$, of 113 oersteds.

Upon examination under an electron microscope, this product is found to consist of needlelike particles of 0.1–6 microns in length with length-to-width ratios of 2:1 to 10:1 (average 8:1).

Another sample of potassium-modified chromium oxide is prepared by the procedure described above with the exception that the chromium trioxide and potassium sulfate solution are heated at 450° C. and 1000 atmospheres pressure for one hour. The product is a finely divided ferromagnetic chromium oxide of acicular particle shape and contains 60.04% chromium.

*Example V*

A sodium-modified ferromagnetic chromium oxide is prepared according to the procedure of Example I except that the quantity of sodium sulfate is reduced to 0.08 part. The product is a black acicular chromium oxide having an intrinsic coercive force, $H_{ci}$, of 66 oersteds and a sigma value, $\sigma_s$, of 82 gauss cm.$^3$/gram. The particles range in length from about 0.8 to about 7 microns and have axial ratios in the range of 2:1 to 5:1. The average axial ratio is about 3:1.

*Example VI*

A flexible platinum tube is charged with 5.00 parts of chromium trioxide, 0.36 part of lithium sulfate monohydrate, and 1.25 parts of water. The tube is sealed, heated under the conditions given in Example IV for 0.5 hour, and the reaction product is worked up as described in that example. There is obtained 3.58 parts of finely divided chromium oxide containing 60.31% chromium, and 400–2000 p.p.m. of lithium. This product has an intrinsic coercive force of 95 oertsteds and a sigma value, $\sigma_s$, of 72 gauss cm.$^3$/gram. Particle lengths range from about 0.5 to about 8 microns, and length-to-width ratios from about 3:1 to about 20:1 (average about 8:1).

*Example VII*

A platinum tube with flexible walls is charged with 5.00 parts of chromium trioxide, 2.37 parts of water, and 0.13 part of potassium sulfate. The tube is sealed and heated at 400° C. under 600 atmospheres pressure for 0.2 hour. The product is a black acicular ferromagnetic chromium oxide having an intrinsic coercive force, $H_{ci}$, of 61 oersteds and a sigma value, $\sigma_s$, of 72 gauss cm.$^3$/gram. The particles range in length from 0.1 to 10 microns and have an average axial ratio of about 2:1. The product is shown by analysis to contain 800–5000 p.p.m. of potassium.

*Example VIII*

A flexible-walled platinum tube is charged with 5.00 parts of chromium trioxide, 0.63 part of cesium sulfate, and 1.25 parts of water. The tube is sealed and heated at 450° C. under 750 atmospheres pressure for one hour. The product has an intrinsic coercive force $H_{ci}$, of 123 oersteds and a sigma value, $\sigma_s$, of 68 gauss cm.$^3$/gram. It is a black cesium-modified chromium oxide and is shown by analysis to contain 0.2–1.0% cesium. The particles range from 0.5 to 6 microns in length and exhibit an average axial ratio of about 6:1.

The process of the present invention, involving the use of alkali metal sulfate solution during the heating step, results in the formation of acicular crystals of chromium oxide, and the introduction of small proportions of alkali metals into the crystal lattice of the chroimum oxide. The products of the present invention are particles having an average length not over 10 microns and having average axial ratios ranging from about 2:1 to about 20:1 or more. Products having an axial ratio of at least 8:1 are particularly well adapted for applications where it is desired to orient the magnetic particles in a coating with the particles substantially all in parallel relationship.

The alkali metal-modified chromium oxides of this invention possess significantly higher intrinsic coercive forces than the chromium oxides of the aforementioned application Serial No. 515,521. Specific applications in which chromium oxides having these high coercive forces are particularly desirable include magnetic recording tapes, drums and records, and focusing magnets.

The alkali metal-modified chromium oxides of this invention are also useful in a wide variety of other applications, especially in the manufacture of ceramic bodies such as magnetic cores. More particularly they are useful in magnetic memory cores for computers, in microwave attenuators, in gyrator elements, in electrically operated high frequency switches, in low-loss transformer cores for megacycle/second frequency ranges, and in magnetic clutches.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A modified ferromagnetic chromium oxide consisting essentially of small acicular particles of tetragonal crystal structure having an average length of not more than 10 microns with no more than 10% of the particles being longer than 10 microns, the said oxide containing 59.5% to 61.9% by weight of chromium and 0.03% to 1% by weight of an alkali metal as an integral constituent of the crystal lattice.

2. A modified ferromagnetic chromium oxide consisting essentially of small acilcular particles of tetragonal crystal structure having a ratio of length to width of at least 2:1 and an average length of not more than 10 microns with no more than 10% of the particles being longer than 10 microns, the said oxide containing 59.5% to 61.9% by weight of chromium and 0.03% to 1% by weight of sodium as an integral constituent of the crystal lattice.

3. A modified ferromagnetic chromium oxide consisting essentially of small acicular particles of tetragonal crystal structure having a ratio of length to width of at least 2:1 and an average length of not more than 10 microns with no more than 10% of the particles being longer than 10 microns, the said oxide containing 59.5% to 61.9% by weight of chromium and 0.03% to 1% by weight of potassium as an integral constituent of the crystal lattice.

4. A modified ferromagnetic chromium oxide consisting essentially of small acicular particles of tetragonal crystal structure having a ratio of length to width of at least 2:1 and an average length of not more than 10 microns with no more than 10% of the particles being longer than 10 microns, the said oxide containing 59.5% to 61.9% by weight of chromium and 0.03% to 1% by weight of lithium as an integral constituent of the crystal lattice.

5. A modified ferromagnetic chromium oxide consisting essentially of small acicular particles of tetragonal crystal structure having a ratio of length to width of at least 2:1 and an average length of not more than 10 microns with no more than 10% of the particles being longer than 10 microns, the said oxide containing 59.5% to 61.9% by weight of chromium and 0.03% to 1% by weight of cesium as an integral constituent of the crystal lattice.

6. A modified ferromagnetic chromium oxide consisting essentially of small acicular particles of tetragonal crystal structure having an average ratio of length to width of at least 8:1 and an average length of not more than 10 microns with no more than 10% of the particles being longer than 10 microns, the said oxide containing 59.5% to 61.9% by weight of chromium and 0.03% to 1% by weight of an alkali metal as an integral constituent of the crystal lattice.

7. A magnetic recording member comprising a carrier of non-magnetic material having bonded thereto a magnetic track of a modified ferromagnetic chromium oxide consisting essentially of small acicular particles of tetragonal crystal structure having an average length of not more than 10 microns with no more than 10% of the particle being longer than 10 microns, the said oxide containing 59.5% to 61.9% by weight of chromium and 0.03% to 1% by weight of an alkali metal as an integral constituent of the crystal lattice.

8. A magnetic recording member comprising a carrier of non-magnetic material having bonded thereto a magnetic track of a modified ferromagnetic chromium oxide and a binder therefor, said modified ferromagnetic chromium oxide consisting essentially of small acicular particles of tetragonal crystal structure having a ratio of length to width of at least 2:1 and an average length of not more than 10 microns with no more than 10% of the particles being longer than 10 microns, the said oxide containing 59.5% to 61.9% by weight of chromium and 0.03% to 1% by weight of sodium as an integral constituent of the crystal lattice.

9. A magnetic recording member comprising a carrier of non-magnetic material having bonded thereto a magnetic track of a modified ferromagnetic chromium oxide and a binder therefor, said modified ferromagnetic chromium oxide consisting essentially of small acicular particles of tetragonal crystal structure having a ratio of length to width of at least 2:1 and an average length of not more than 10 microns with no more than 10% of the particles being longer than 10 microns, the said oxide containing 59.5% to 61.9% by weight of chromium and 0.03% to 1% by weight of potassium as an integral constituent of the crystal lattice.

10. A magnetic recording member comprising a carrier of non-magnetic material having bonded thereto a magnetic track of a modified ferromagnetic chromium oxide and a binder therefor, said modified ferromagnetic chromium oxide consisting essentially of small acicular particles of tetragonal crystal structure having a ratio of length to width of at least 2:1 and an average length of not more than 10 microns with no more than 10% of the particles being longer than 10 microns, the said oxide containing 59.5% to 61.9% by weight of chromium and 0.03% to 1% by weight of lithium as an integral constituent of the crystal lattice.

11. A magnetic recording member comprising a carrier of non-magnetic material having bonded thereto a magnetic track of a modified ferromagnetic chromium oxide and a binder therefor, said modified ferromagnetic chromium oxide consisting essentially of small particles of tetragonal crystal structure having a ratio of length to width of at least 2:1 and an average length of not more than 10 microns with no more than 10% of the particles being longer than 10 microns, the said oxide containing 59.5% to 61.9% by weight of chromium and 0.03% to 1% by weight of cesium as an integral constituent of the crystal lattice.

12. A magnetic recording member comprising a carrier of non-magnetic material having bonded thereto a magnetic track of a modified ferromagnetic chromium oxide and a binder therefor, said modified ferromagnetic chromium oxide consisting essentially of small acicular particles of tetragonal crystal structure having an average ratio of length to width of at least 8:1 and an average length of not more than 10 microns with no more than 10% of the particles being longer than 10 microns, the said oxide containing 59.5% to 61.9% by weight of chromium and 0.03% to 1% by weight of an alkali metal as an integral constituent of the crystal lattice.

13. Process for preparing a modified ferromagnetic chromium oxide which comprises heating chromium trioxide in an aqueous alkali metal sulfate solution at a temperature within the range of 400 to 525° C. under a pressure of at least 500 atmospheres, and separating and drying as the resulting product a modified ferromagnetic chromium oxide containing 59.5% to 61.9% by weight of chromium and 0.03% to 1% by weight of an alkali metal as an integral constituent of the crystal lattice.

14. Proces for preparing a modified ferromagnetic chromium oxide which comprises heating chromium trioxide in an aqueous sodium sulfate solution at a temperature within the range of 400 to 525° C. under a pressure of at least 500 atmospheres, and separating and drying as the resulting product a modified ferromagnetic chromium oxide containing 59.5% to 61.9% by weight of chromium and 0.03% to 1% by weight of sodium as an integral constituent of the crystal lattice.

15. Process for preparing a modified ferromagnetic chromium oxide which comprises heating chromium trioxide in an aqueous potassium sulfate solution at a temperature within the range of 400 to 525° C. under a pressure of at least 500 atmospheres, and separating and drying as the resulting product a modified ferromagnetic chromium oxide containing 59.5% to 61.9% by weight of chromium and 0.03% to 1% by weight of potassium as an integral constituent of the crystal lattice.

16. Process for preparing a modified ferromagnetic chromium oxide which comprises heating chromium trioxide in an aqueous lithium sulfate solution at a temperature within the range of 400 to 525° C. under a pressure of at least 500 atmospheres, and separating and drying as the resulting product a modified ferromagnetic chromium oxide containing 59.5% to 61.9% by weight of chromium and 0.03% to 1% by weight of lithium as an integral constituent of the crystal lattice.

17. Process for preparing a modified ferromagnetic chromium oxide which comprises heating chromium trioxide in an aqueous cesium sulfate solution at a temperature within the range of 400 to 525° C. under a pressure of at least 500 atmospheres, and separating and drying as the resulting product a modified ferromagnetic chromium oxide containing 59.5% to 61.9% by weight of chromium and 0.03% to 1% by weight of cesium as an integral constituent of the crystal lattice.

18. Process for preparing a modified ferromagnetic chromium oxide as set forth in claim 13 in which said chromium trioxide is heated in an aqueous alkali metal sulfate solution at a temperature within the range of 450 to 475° C. under said pressure of at least 500 atmospheres.

19. Process for preparing a modified ferromagnetic chromium oxide as set forth in claim 13 in which said chromium trioxide is heated in an amount of aqueous alkali metal sulfate solution of from 0.1 to 1.25 times the weight of said chromium trioxide and said aqueous alkali metal sulfate solution contains from 4 to 50% by weight of alkali metal sulfate.

20. Process for preparing a modified ferromagnetic chromium oxide as set forth in claim 13 in which said chromium trioxide is heated in an amount of aqueous alkali metal sulfate solution of from 0.1 to 0.5 times the weight of said chromium trioxide and said aqueous alkali metal sulfate solution contains from 20 to 30% by weight of alkali metal sulfate.

21. Process for preparing a modified ferromagnetic chromium oxide as set forth in claim 13 in which said aqueous alkali metal sulfate solution contains a small amount of sulfuric acid.

22. Process for preparing a modified ferromagnetic chromium oxide as set forth in claim 13 in which the reaction mixture, after heating at said temperature of 400 to 525° C. under said pressure of at least 500 atmospheres, is cooled to room temperature of about 25° C. while maintaining pressure thereon of at least 500 atmospheres.

References Cited in the file of this patent

UNITED STATES PATENTS

| | | |
|---|---|---|
| 2,694,656 | Camras | Nov. 16, 1954 |
| 2,699,408 | Camras | Jan. 11, 1955 |

OTHER REFERENCES

Comptes Rendus, vol. 219, pp. 58–60, July 10, 1944.

Jour. Amer. Chem. Soc., vol. 74, pp. 2362–2364, May 5, 1952.

Ferromagnetism by Bozorth, p. 342, pub. by D. Van Nostrand Co., Inc., N.Y., 1951.